United States Patent [19]

Saito et al.

[11] Patent Number: 4,632,330
[45] Date of Patent: Dec. 30, 1986

[54] AUTOMATIC LOCKING RETRACTOR

[75] Inventors: Hiroyuki Saito, Chigasaki; Takeo Ueda, Fujisawa, both of Japan

[73] Assignee: NSK-Warner K. K., Japan

[21] Appl. No.: 737,446

[22] Filed: May 24, 1985

[30] Foreign Application Priority Data

Jun. 1, 1984 [JP] Japan .............................. 59-80436[U]
Aug. 9, 1984 [JP] Japan ............................ 59-121414[U]

[51] Int. Cl.[4] ............................................. B60R 22/34
[52] U.S. Cl. ............................................. 242/107.4 D
[58] Field of Search ................ 242/107.4 D, 107.4 R, 242/107.4 A, 107.4 B, 107.7; 280/807; 297/476

[56] References Cited

U.S. PATENT DOCUMENTS

| 3,659,801 | 5/1972 | Romanzi | 242/107.4 D |
| 3,667,698 | 6/1972 | Fisher | 242/107.4 D |
| 3,848,827 | 11/1974 | Tamarin | 242/107.7 |
| 3,945,586 | 3/1976 | Higbee et al. | 242/107.4 D |
| 4,496,116 | 1/1985 | Ono | 242/107.4 D |
| 4,498,643 | 2/1985 | Ono | 242/107.4 D |

*Primary Examiner*—John M. Jillions
*Attorney, Agent, or Firm*—Wegner & Bretschneider

[57] ABSTRACT

An automatic locking retractor suitable for use in a vehicle seat belt includes locking means which is composed of a latch plate rotatable as a unitary member with a take-up spindle and a lock member engageable with the latch plate to prevent the rotation of the take-up spindle. The engagement between the latch plate and lock member is controlled by a cam member or disk of a simple structure. Making use of magnetism, the cam member or disk is kept in a cooperative relation with the latch plate or take-up spindle. The automatic locking retractor requires fewer parts, and hence permits easy parts handling and facilitates its assembly work. It is also compact.

1 Claim, 15 Drawing Figures

AUTOMATIC LOCKING RETRACTOR

BACKGROUND OF THE INVENTION

(1) Field of the Invention:

This invention relates to an automatic locking retractor which when its associated webbing has been pulled out over a suitable length thereof from its fully-wound state and worn by an occupant, automatically locks the webbing to avoid any further release of the webbing.

(2) Description of the Prior Art:

Several types of automatic locking retractors have already been known.

In an automatic locking retractor of one of such conventional types, lock means which includes a latch plate rotatable as a unitary member with a take-up spindle and a lock member engageable with the latch plate to prevent the rotation of the take-up spindle is controlled by a cam member supported on the take-up spindle and equipped with a projection so that the lock means is held at a non-locking position until an associated webbing is pulled out over a predetermined length thereof but the lock means is held at a locking position owing to the rewinding of the webbing subsequent to its wearing. In this case, the cam member is pressed against the latch plate or take-up spindle by spring means so that the cam member is allowed to turn together with the take-up spindle within a predetermined range owing to a frictional force developed therebetween.

In retractors of the above-described type, the retractors are designed in such a way that their cam members are actuated making use of frictional forces. They thus require spring means or the like. In addition, it is necessary to provide attachment spacings for such spring means or the like along the take-up spindles. There is another demand for the development of a retractor constructed of fewer parts with a view toward facilitating the parts handling and the assembly work.

SUMMARY OF THE INVENTION

An object of this invention is therefore to solve the above-mentioned drawbacks of conventional automatic locking retractors and to provide a compact automatic locking retractor of a simple structure.

In the first aspect of this invention, there is thus provided an automatic locking retractor which comprises:

a casing;

a take-up spindle for winding an associated webbing thereon, said take-up spindle being supported rotatably on the casing and biased in the webbing-winding direction;

a latch plate equipped with teeth, which have interlocking faces directed toward the webbing-releasing direction, and rotatable as a unitary member with the take-up spindle;

a lock member displaceable between a locking position, where the lock member is brought into engagement with either one of the interlocking faces so that the take-up spindle is prevented from rotating in the webbing-releasing direction but is allowed to rotate in the webbing-winding direction, and a non-locking position where the lock member is kept out of engagement with any of the interlocking faces;

control means for guiding the lock member from the non-locking position to the locking position when the webbing has been rewound subsequent to its release at least over a predetermined length thereof, said control means having cam means displaceable together with the take-up spindle within a predetermined range and magnetic means for holding the cam means in a cooperative relation with the take-up spindle within the predetermined range; and sensing means for sensing each rewinding of the webbing at least over the predetermined length thereof to hold the lock member at the non-locking position.

In the automatic locking retractor according to the above-described first aspect of this invention, the locking of the take-up spindle and the release of the locking are effected by the control means of such a simple structure as described above. The automatic locking retractor permits easy parts handling and facilitates its assembly work.

In the second aspect of this invention, there is also provided an automatic locking retractor which comprises:

a casing;

a take-up spindle for winding an associated webbing thereon, said take-up spindle being supported rotatably on the casing and biased in the webbing-winding direction;

a latch plate equipped with teeth, which have interlocking faces directed toward the webbing-releasing direction, and rotatable as a unitary member with the take-up spindle;

a lock member supported on the casing in such a way that the lock member is displaceable between a locking position, where the lock member is engageable with either one of the interlocking faces, prevents the take-up spindle from rotating in the webbing-releasing direction but allows the take-up spindle to rotate in the webbing-winding direction, and a non-locking position where the lock member is kept out of engagement with any of the interlocking faces;

cam means provided displaceably within a predetermined range in a cooperative relation with the take-up spindle so that the cam means can selectively assume a first position, where the cam means is brought into engagement with the lock member to hold the lock member at the non-locking position, and a second position where the cam means allows the lock member to move to the locking position; and magnetic means for holding the cam means in the cooperative relation with the take-up spindle within the predetermined range by a magnetic action.

In the automatic locking retractor according to the second aspect of this invention, the locking of the take-up spindle and the release of the locking is achieved by the cam means of a simple structure and shape. Thus, the automatic locking retractor has a large degree of freedom with respect to the mounting position of the cam means, facilitates its assembly and is compact.

The above and other objects, features and advantages of the present invention will become more apparent from the following description and the appended claims, taken in conjunction with the accompanying drawings.

DETAILED DESCRIPTION OF THE INVENTION AND PREFERRED EMBODIMENT

Referring first to FIGS. 1 through 6 of the accompanying drawings, the automatic locking retractor according to the first embodiment of this invention will be described.

Figure 1:
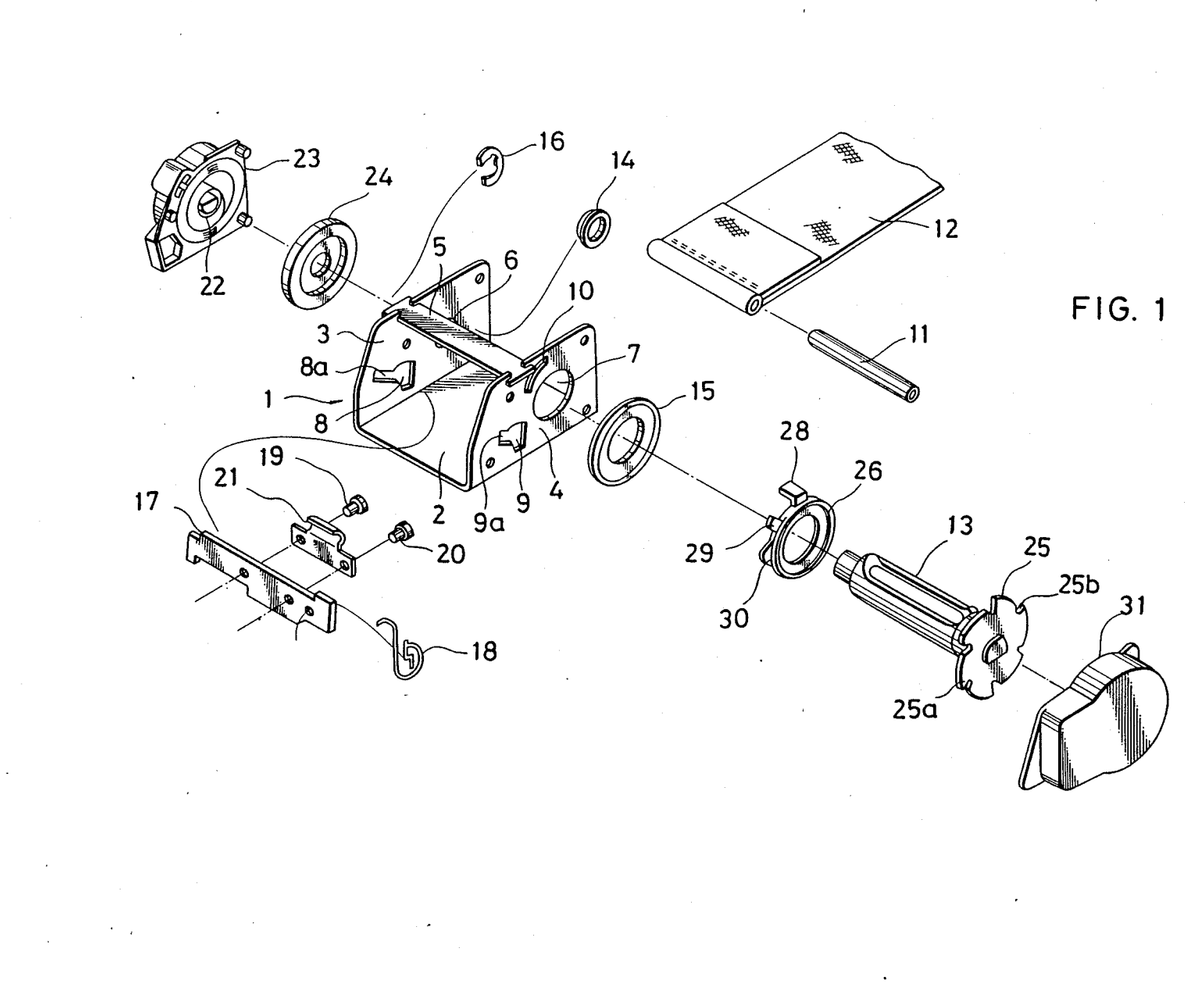
FIG. 1 is an exploded perspective view of an automatic locking retractor according to the first embodiment of this invention.
Figure 2:
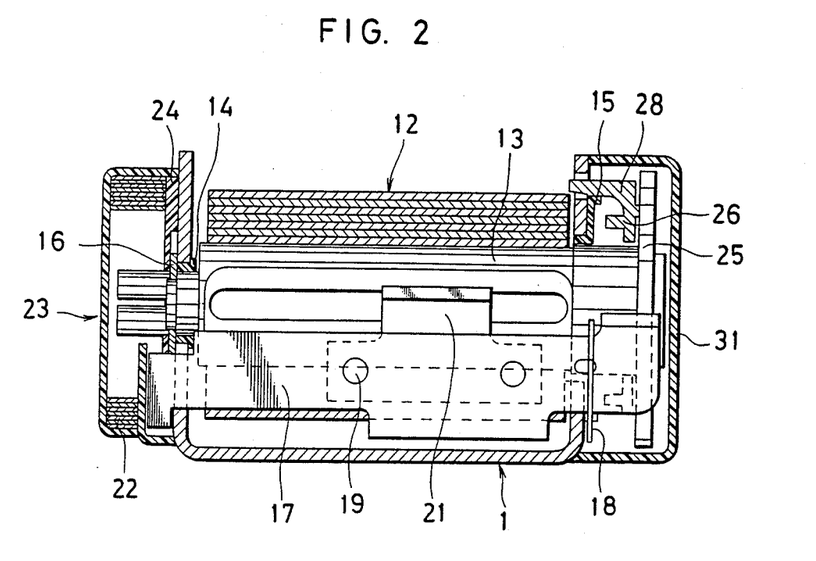
FIG. 2 is a partly cross-sectional front elevation of the automatic locking retractor of FIG. 1, showing the automatic locking retractor in its assembled form.

In FIGS. 1 and 2, a casing 1 includes a rear wall 2, a pair of mutually-opposing side walls 3,4 which extend upright from the corresponding sides of the rear wall 2, and a reinforcement tie bar 5. Through the side walls 3,4, circular through-holes 6,7 and substantially sectorial through-holes 8,9 are bored respectively in opposing relations. Through the side wall 4, an arcuate slot is also bored at a position radially outside the through-hole 7.

Between the circular through-holes 6,7, a take-up spindle 13 on which a webbing 12 is provided by way of a rod 11 is rotatably supported via left and right resin-made bushes 14,15 and a stopper ring 16. A lock member 17 is tiltably supported between the through-holes 8,9, and is biased by a spring 18 so that the lock member 17 is tilted toward the take-up spindle 13. When assembling the lock member 17 in the casing 1, the lock member 17 is first inserted in extensions 8a,9a of the through-holes 8,9 and is then shifted to and received in the sectorial through-holes 8,9. A sensor plate 21 is fixedly attached to the lock member 17 by pins 19,20. The sensor plate 21 is brought into contact with a webbing 12 in an initial stage upon pulling the webbing 12 out of the retractor for its wearing, whereby to prevent the lock member 17 from tilting down toward the take-up spindle 13.

A take-up spring 22 is hooked at the inner end thereof on one end (the upper left end as viewed in FIG. 1) of the take-up spindle 13, while the outer end of the take-up spring 22 is hooked on the inner wall of a spring cover 23 which is fixedly secured on the casing 1. A spring plate 24 is interposed between the take-up spring 22 and the side wall 3 of the casing 1, whereby to prevent the take-up spring 22 from scrubbing the side wall 3. The take-up spring 22 serves to normally urge the take-up spindle 13 in the webbing-winding direction.

A latch plate 25 is fixedly mounted on the other end (the upper right end as viewed in FIG. 1) of the take-up spindle 13 and is thus caused to rotate together with the take-up spindle 13. A disk 26 is interposed as cam means between the latch plate 25 and a bush 15 fit on the side wall 4 of the casing 1.

The disk 26 is composed of a central annular portion loose-fit rotatably on the take-up spindle 13, and projections 28,29,30 provided on the outer circumference of the annular portion. Since the disk 26 is made of a magnet, the disk 26 is, owing to its magnetism, attracted to and kept seated on the latch plate 25 which is made of a magnetic metal. The projection 28 of the disk 26 extends shortly in a radial direction from the outer circumference of the annular portion, is then bent toward the arcuate slot of the side wall 4 and extends further into the arcuate slot 10. Therefore, the disk 26 is allowed to turn together with the latch plate 25 within the range of the arcuate slot 10. However, the turning motion of the disk 26 is stopped when the projection 28 is brought into contact with either one of the ends of the arcuate slot 10. The projections 29,30 of the disk 26 are arranged and shaped, as will be described herein, in such a way that they can serve as control means for the lock member 17.

On the other hand, the latch plate 25 has a plurality of teeth 25a on its outer circumference. Each tooth 25a is directed toward the webbing-releasing direction, and is equipped with an interlocking face 25b which is brought into engagement with the lock member 17 when the lock member 17 is tilted.

The disk 26 and latch plate 25 are both covered by a cover 31 which is fixedly provided on the side wall 4.

The operation of the automatic locking retractor according to the first embodiment, which has the above-described structure, will next be described.

Figure 3:
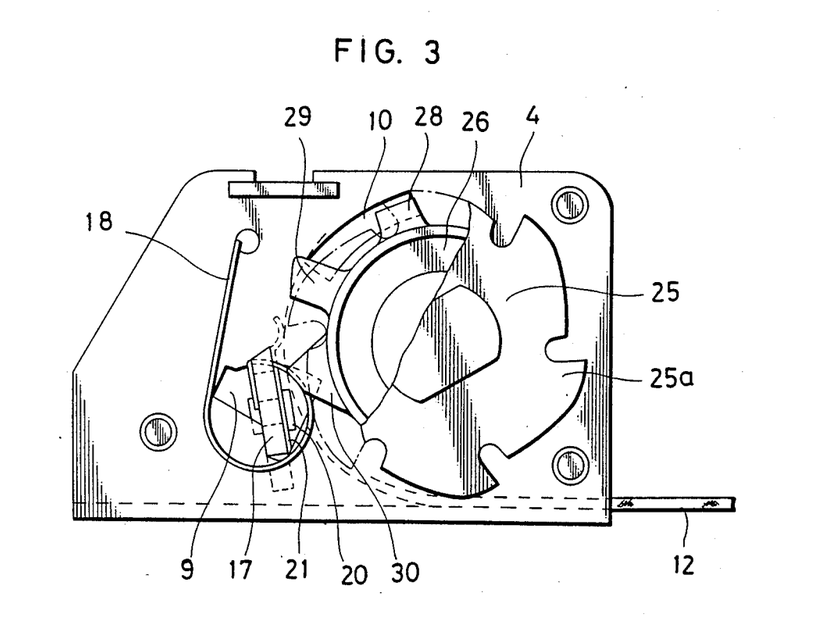
FIGS. 3 through 6 are partly cut-away side elevations of the automatic locking retractor of Figs. 1 and 2, illustrating its operation in different stages.

While the seat belt is not in use, the webbing 12 has been taken up substantially over the entire length thereof and is in the position illustrated in FIG. 3. At this stage, the projection 28 of the disk 26 is kept in contact with the upper end edge (on the winding side, i.e., the side turned most clockwise) of the arcuate slot 10. On the other hand, the lock member 17 has been rocked counterclockwise and is held at the non-locking position, because the sensor plate 21 has been kept in contact with the outermost surface of the webbing 12 taken up in layers on the take-up spindle 13 and has thus been pushed outwardly by the outermost surface of the thus-wound webbing 12. At the non-locking position, the lock member 17 is kept out of engagement with any tooth 25a of the latch plate 25. Incidentally, the sensor plate 21 may also be formed as a part of the lock member 17, in other words, integrally with the lock member 17.

Figure 4:
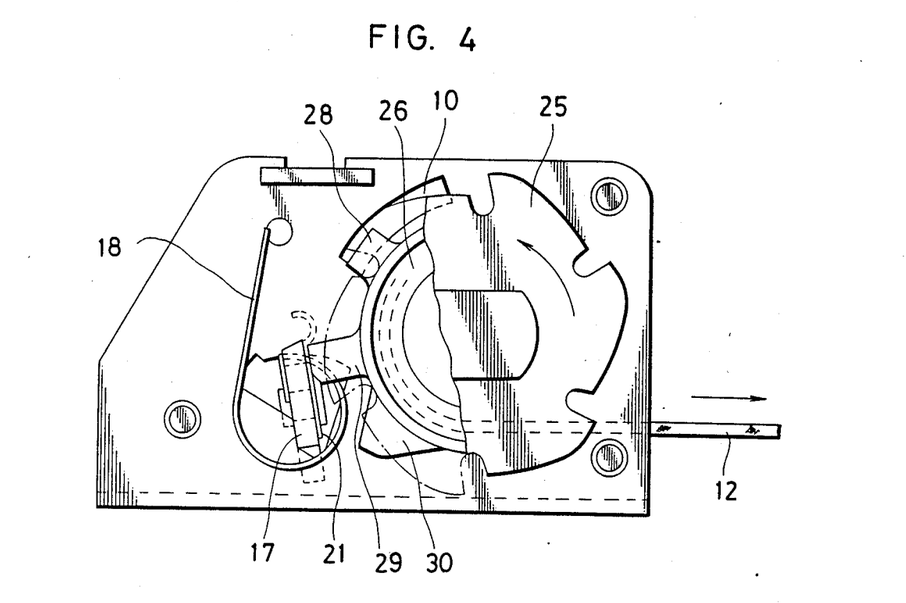

While the occupant is pulling the webbing 12 out of the retractor from the state shown in FIG. 3 to the state depicted in FIG. 4 against the biasing force of the take-up spring 22 in order to wear the seat belt, the take-up spindle 13 and latch plate 25 are rotated counterclockwise as viewed in FIG. 4. The disk 26 is allowed to turn together with the latch plate 25 over the same angular distance as the projection 28 of the disk 26 can turn. Its turning motion is however stopped when the projection 28 is brought into contact with the other end edge (namely, the end edge turned most counterclockwise) of the arcuate slot 10. Owing to this turning motion of the disk 26, the projection 29 is caused to slide in underneath the lock member 17 which has been kept in the non-locking position owing to the action of the sensor plate 21, whereby to hold the lock member 17 further at the non-locking position (in the state shown in FIG. 4).

When the webbing 12 is pulled out subsequently, the above state is maintained. The lock member 17 is thus kept out of engagement from the teeth 25a of the latch plate 25, thereby permitting smooth release of the webbing 12.

While the webbing 12 is being pulled out, the disk 26 and the latch plate 25 are kept together by a magnetic force only. Therefore, the disk 26 and latch plate 25 are allowed to slide on each other. Namely, the latch plate 25 is solely caused to rotate.

The wearing of the webbing 12 can be completed, for example, by inserting the tang (not shown) of the webbing 12 into a buckle (not illustrated) after the webbing has been released over a suitable length thereof. At this stage, the webbing 12 is usually rewound over a small length thereof owing to the force of the take-up spring 22. Accordingly, the disk 26 is caused to turn together with the latch plate 25 in the winding-direction (i.e., clockwise as viewed in FIG. 5) (in the state illustrated in FIG. 5). Although the projection 30 of the disk 26 is in a position slid in underneath the lock member 17 at this stage, the lock member 17 is still engageable with either one of the teeth 25b of the latch plate 25 because the projection 30 is formed in such a way that its free end is positioned inside the tips of the teeth 25b of the latch plate 25.

Figure 5:
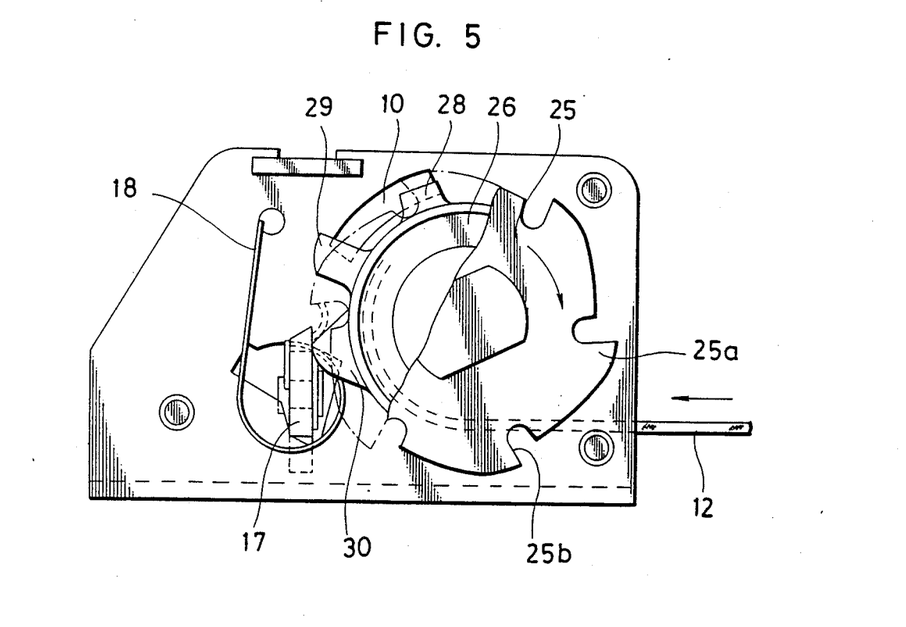

When the webbing 12 is pulled out from the above position for example by a frontward movement of the occupant, the disk 26 is again turned counterclockwise together with the latch plate 25 and the lock member 17, which is biased clockwise in FIG. 5 by the spring 18, falls in the recess defined between the projections 29 and 30 of the disk 26. The lock member 17 is thus brought into engagement with the interlocking face 25b of one of the teeth 25a of the latch plate 25, thereby assuming the locking position (the state illustrated in FIG. 6). This is the state in which the take-up spindle 13 is locked with respect to its rotation in the webbing-releasing direction subsequent to the wearing of the webbing 12.

Even if the webbing 12 is pulled in the above state, the webbing 12 is prevented from any further release owing to the engagement of the lock member 17 and the interlocking face 25b of the latch plate 25. However, the winding of the webbing 12 is still feasible because it causes the latch plate 25 to turn in a direction in which the engagement between the lock member 17 and interlocking face 25b is released (clockwise).

Figure 6:
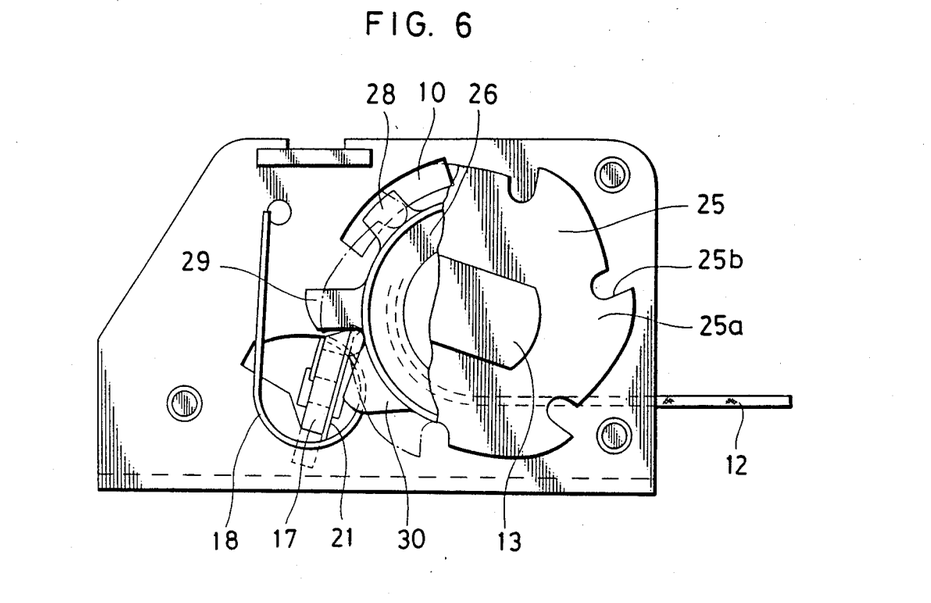

In other words, when the latch plate 25 turns in the webbing-winding direction, i.e., in the clockwise direction as viewed in FIG. 6, the lock member 17 slides on the back portions of the teeth 25a of the latch plate 25 and is thus pushed outwardly in the radial direction. The disk 26 then turns together with the latch plate 25, on which the disk 26 is attracted by magnetism, until the projection 30 of the disk 26 comes into contact with the lock member 17 and receives softly the lock member 17 which has separated from the tip of the tooth 25a of the latch plate 25.

Thereafter, the lock member 17 pushes back the disk 26 in the counterclockwise direction as viewed in FIG. 5 owing to the biasing force of the spring 18 and then assumes the position shown in FIG. 6 where the lock member 17 is again engageable with either one of the teeth 25a of the latch plate 25.

When the webbing 12 is progressively pulled out further, the lock member 17 is caused to rock between the locking position and the non-locking position in the same manner as described above. It is therefore possible to avoid violent collision between the related elements and hence to avoid generation of unpleasant noises. The above rocking motion continues until the sensor plate 21 of the lock member 17 is brought into contact with the webbing 12 to push the lock member 17 backward, i.e., outwardly in the counterclockwise direction. Even when the webbing 12 is suddenly pulled out in the course of its rewinding, the locking of the latch plate 25 can be effected surely without being hit back by one or more teeth 25b of the latch plate 25 as the lock member 17 is arranged in such a way that the proximal edge of the lock member 17 is always located within the circular path defined by the tips of the teeth 25a of the latch plate 25.

Figure 7:
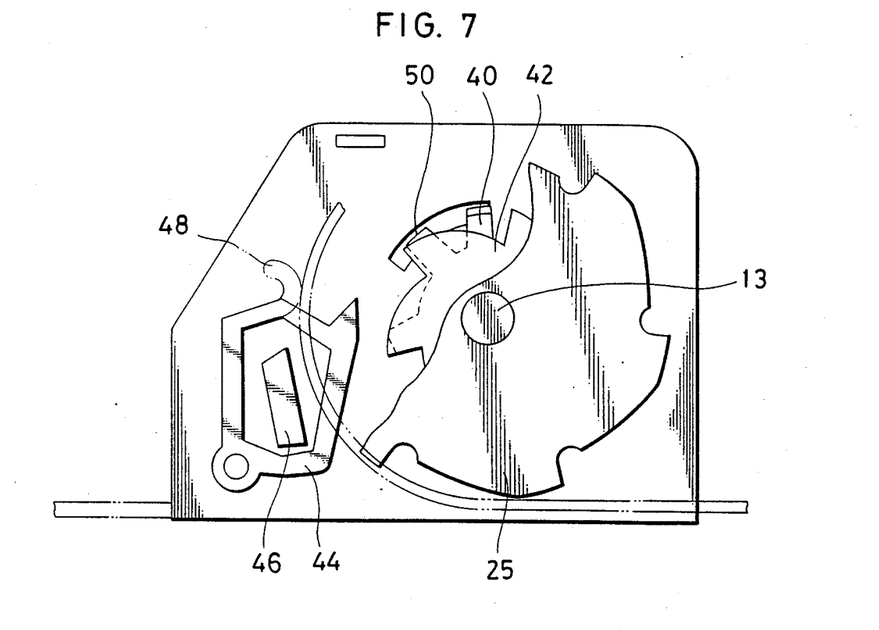
FIG. 7 is a partly cut-away side elevation of an automatic locking retractor according to the second embodiment of this invention.

Referring next to FIG. 7, the automatic locking retractor according to the second embodiment of this invention will be described. In this embodiment, a disk 40 formed of a magnet is also attracted on the latch plate 25 which rotates together with the take-up spindle 13. The automatic locking retractor according to the second embodiment is additionally provided with a latch gear 42 rotatable together with the take-up spindle 13 and a ratchet lever 44 which is engageable with the latch gear 42. The ratchet lever 44 is biased in a direction in which it is engageable with the latch gear 42 (i.e., in the clockwise direction as viewed in FIG. 7), while a lock member 46 engageable with the latch plate 25 is urged toward the non-locking position. Incidentally, a sensor member 48 is provided as a unitary member with the ratchet lever 44. Control means is made up of a disk 40, latch gear 42 and ratchet lever 44.

In the second embodiment, the movement of the ratchet lever 44 is controlled by the disk 40 in the same manner as in the first embodiment. When the webbing is rewound after it has been released for its wearing, the engagement between a protrusion 50 and the ratchet lever 44 is released, resulting in engagement between the latch gear 42 and ratchet lever 44. When the webbing is subsequently pulled in the webbing-releasing direction, the ratchet lever 44 is caused to turn clockwise as viewed in FIG. 7. This clockwise turning motion of the ratchet lever 44 permits engagement between the lock member 46 and latch plate 25, thereby to prevent any further rotation of the take-up spindle 13 in the webbing-releasing direction.

The automatic locking retractor according to the third embodiment of this invention will now be described with reference to FIGS. 8 and 9, in which like elements of structure are identified by like reference numerals in FIGS. 1 through 6. Description on such like elements of structure will hence be omitted for the sake of brevity. A short protrusion 60 formed by semi-shearing is provided as guide means on the side wall 4 of the casing 1. The lock member 17 is biased by a spring 62 in such a way that the lock member 17 is tilted toward the take-up spindle 13. A cam member 63 is arranged as cam means between the latch plate 25 and the side wall 4 of the casing 1.

Figure 8:
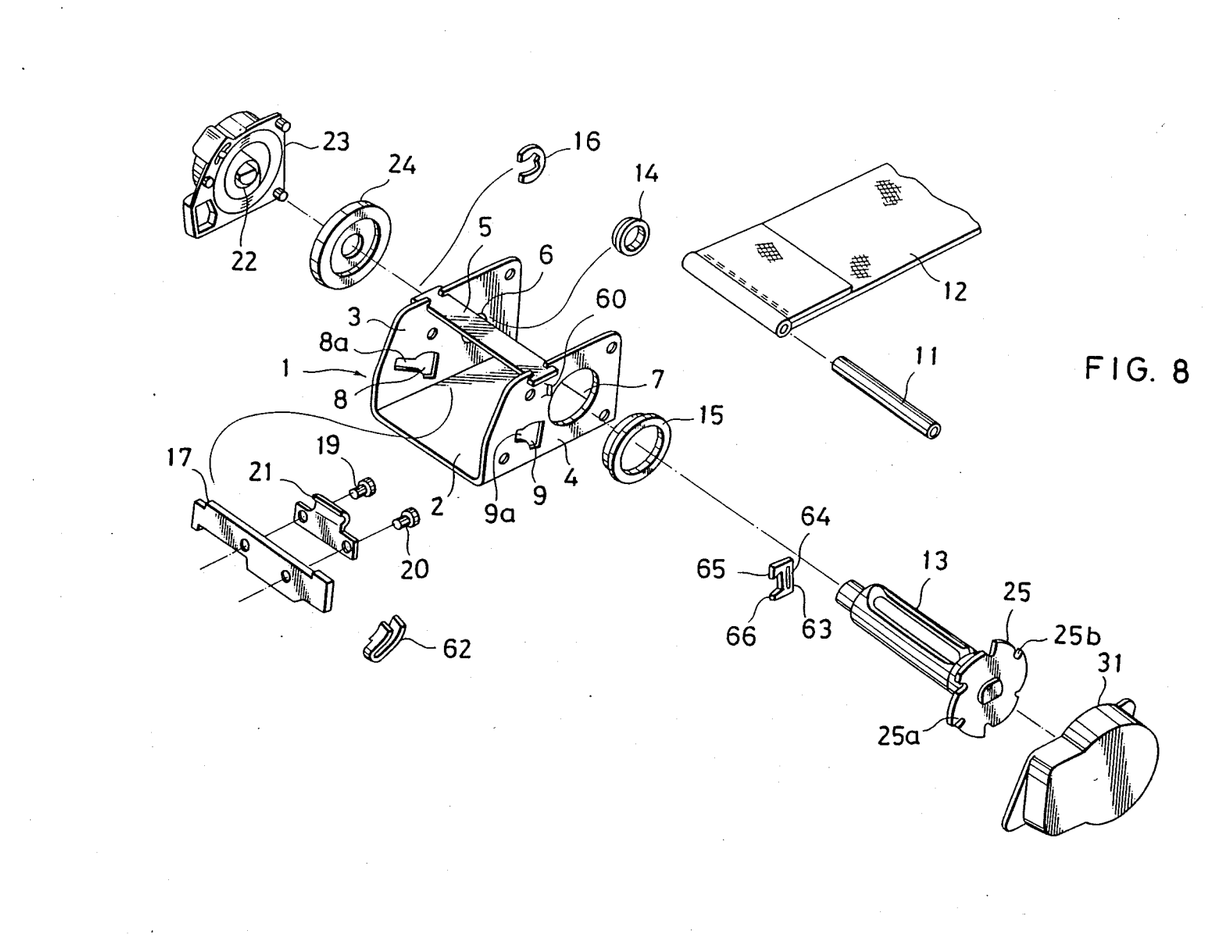
FIG. 8 is an exploded perspective view of an automatic locking retractor according to the third embodiment of this invention.

The cam member 63 defines a slot 64, in which the short protrusion 60 formed by semi-shearing on the side wall 4 is received, and arms 65,66 as first and second cam portions which extend leftwards as viewed in FIG. 8. Therefore, the cam member 63 is displaceable up and down within a predetermined range along the short protrusion 60 on the side wall 4. Since the cam member 63 is formed of a magnet, it is, owing to its magnetism, attracted to and seated on the latch plate 25 made of a magnetic metal. The arms 65,66 of the cam member 63 are arranged and shaped in such a way that they serve as control means for the lock member 17 as will be described herein.

The cam member 63 and latch plate 25 are both covered by the cover 31 mounted fixedly on the side wall 4 of the casing 1.

The operation of the above-described automatic locking retractor according to the third embodiment of this invention will next be described.

While the seat belt is not in use, the webbing 12 has been taken up substantially over the entire length thereof. At this stage, the slot 64 of the cam member 63 is kept at its lower end edge in contact with the webbing-releasing end face (the lower end face) of the short protrusion 60. On the other hand, the lock member 17 has been rocked counterclockwise as viewed in FIG. 8 and is held at the non-locking position, because the sensor plate 21 has been kept in contact with the outermost surface of the webbing 12 taken up in layers on the take-up spindle 13 and has thus been pushed outwardly by the outermost surface of the thus-wound webbing 12. At the non-locking position, the lock member 17 is kept out of engagement with any of the teeth 25a of the latch plate 25. Incidentally, the sensor plate 21 may also be formed as a part of the lock member 17, in other words, integrally with the lock member 17.

While the occupant is pulling the webbing 12 out of the retractor against the biasing force of the take-up spring 22 in order to wear the seat belt, the take-up spindle 13 and latch plate 25 are rotated counterclockwise as viewed in FIG. 8. The cam member 63 cooperates owing to its magnetism with the latch plate 25 to move down linearly over the same distance as the slot 64 of the cam member 63 moves. Its downward movement is then stopped when the short protrusion 60 on the side wall 4 is brought into contact with the other end edge (namely, the upper end edge) of the slot 64. Thus, the cam member 63 is allowed to move to the first position as shown in Fig. 9. Owing to this movement of the cam member 63, the arm 65, i.e., the first cam portion is caused to slide in underneath the lock member 17 which has been kept in the non-locking position owing to the action of the sensor plate 21, whereby to hold the lock member 17 further at the non-locking position (in the state shown in FIG. 9).

When the webbing 12 is pulled out subsequently, the above state is maintained. The lock member 17 is thus kept out of engagement from the teeth 25a of the latch plate 25, thereby permitting smooth release of the webbing 12.

While the webbing 12 is being pulled out, the cam member 63 and the latch plate 25 are kept together by a magnetic force only. Therefore, the cam member 63 and latch plate 25 are allowed to slide on each other. Namely, the latch plate 25 is solely caused to rotate.

The wearing of the webbing 12 can be completed, for example, by inserting the tang (not shown) of the webbing 12 into a buckle (not illustrated) after the webbing has been released over a suitable length thereof. At this stage, the webbing 12 is usually rewound over a small length thereof owing to the force of the take-up spring 22. Accordingly, the cam member 63 is caused to move upwardly together with the latch plate 25 owing to its magnetism. Although the arm 66, i.e., the second cam portion of the cam member 63 is in a position slid in underneath the lock member 17 at this stage, the lock member 17 is still engageable with either one of the teeth 25b of the latch plate 25 because the tip of the arm 66 is formed in such a way that the tip of the lock member 17 is positioned inside the tips of the teeth 25b of the latch plate 25.

Figure 9:
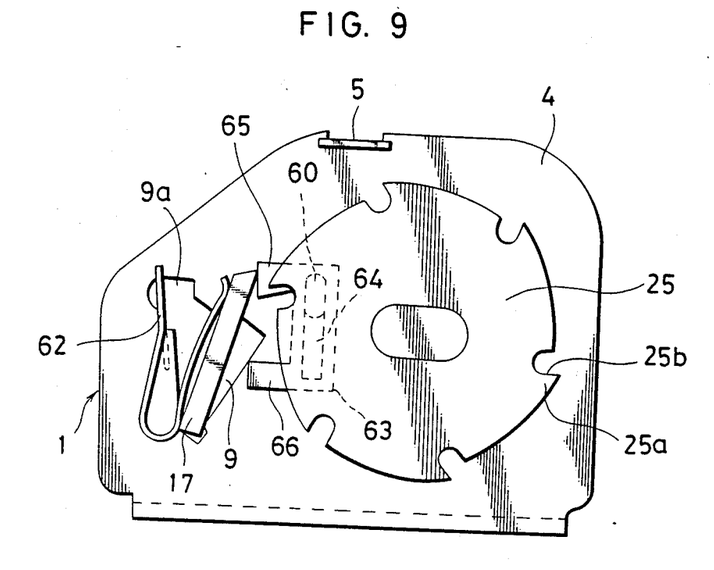
FIG. 9 is a side elevation of the automatic locking retractor of FIG. 8, from which a cover 31 has been removed.

When the webbing 12 is pulled out from the above position for example by a frontward movement of the occupant, the cam member 63 is again moved downwardly toward the first position together with the latch plate 25 and the lock member 17, which is biased clockwise in FIG. 9 by the spring 62, falls in the recess defined between the arms 65 and 66 of the cam member 63. The lock member 17 is thus caused to take the second position so that the lock member 17 is kept in engagement with the interlocking face 25b of one of the teeth 25a of the latch plate 25. This is the state in which the take-up spindle 13 is automatically locked with respect to its rotation in the webbing-releasing direction subsequent to the wearing of the webbing 12.

Even if the webbing 12 is pulled in the above state, the webbing 12 is prevented from any further release owing to the engagement of the lock member 17 and the interlocking face 25b of the latch plate 25. However, the winding of the webbing 12 is still feasible because it causes the latch plate 25 to turn in a direction in which the engagement between the lock member 17 and interlocking face 25b is released (clockwise).

In other words, when the latch plate 25 turns in the webbing-winding direction, i.e., in the clockwise direction as viewed in FIG. 9, the lock member 17 slides on the back portions of the teeth 25a of the latch plate 25 and is thus pushed somewhat outwardly in the radial direction. At the same time, the cam member 63 moves together with the latch plate 25, on which the cam member 63 is attracted by magnetism, until the arm 66 of the cam member 63 comes into contact with the lock member 17 and receives softly the lock member 17 which has separated from the tip of the tooth 25a of the latch plate 25.

Thereafter, the lock member 17 pushes back the cam member 63 downwardly toward the first position as viewed in FIG. 9 owing to the biasing force of the spring 62.

When the webbing 12 is progressively rewound, the lock member 17 is caused to rock between the two points within its locking position in the same manner as described above. However, violent collision between the related elements can be avoided, thereby preventing generation of unpleasant noises. The above rocking motion continues until the sensor plate 21 of the lock member 17 is brought into contact with the webbing 12 to push the lock member 17 backward, i.e., outwardly in the counterclockwise direction to its non-locking position completely. Even when the webbing 12 is suddenly pulled out in the course of its rewinding, the locking of the latch plate 25 can be effected surely without being hit back by one or more teeth 25b of the latch plate 25 as the lock member 17 is arranged in such a way that the proximal edge of the lock member 17 is always located within the circular path defined by the tips of the teeth 25a of the latch plate 25.

In order to prevent the lock member 17 from being repeatedly received by the arm 66 after its respective separation from the tips of the teeth 25b of the latch plate 25, the proximal edge of the lock member 17 may however be positioned somewhat outside the circular path of the tips of the teeth 25b of the latch plate 25 when the lock member 17 is in contact with the arm 66.

Figure 10:
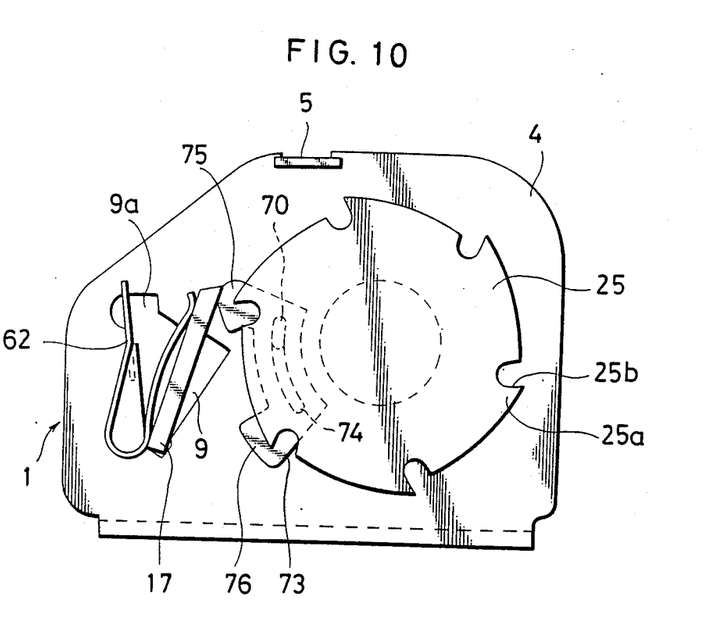
FIG. 10 is similar to FIG. 9 but illustrates an automatic locking retractor according to the fourth embodiment of this invention.

FIG. 10 illustrates the automatic locking retractor according to the fourth embodiment of this invention, in which the retractor is equipped with a cam member 73 which operates in a manner somewhat different from the cam member 63 in the third embodiment.

The cam member 73 defines an arcuate slot 74 in which a short protrusion 70, similar to the short protrusion 60 in the third embodiment, is fit. Therefore, the cam member 73 is allowed to undergo turning motion together with the latch plate 25 within a predetermined range. While an arm 75 which is a first cam portion is kept in engagement with the lock member 17 as shown in FIG. 10, the lock member 17 is maintained at the non-locking position. When the cam member 73 moves clockwise, in other words, in the webbing-winding direction from the above-mentioned first state, the lock member 17 is caused to fall within a recess defined between both arms 75 and 76 and thus assumes the locking position. When the cam member 73 turns further in the webbing-winding direction, the arm 76 is brought into contact with the lock member 17.

The operation of the automatic locking retractor according to the fourth embodiment is exactly the same as that of the automatic locking retractor according to the third embodiment.

Figure 11:
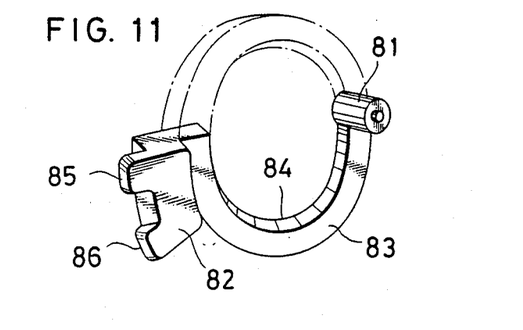
FIG. 11 is a perspective view of a cam member incorporated in an automatic locking retractor according to the fifth embodiment of this invention.
Figure 12:
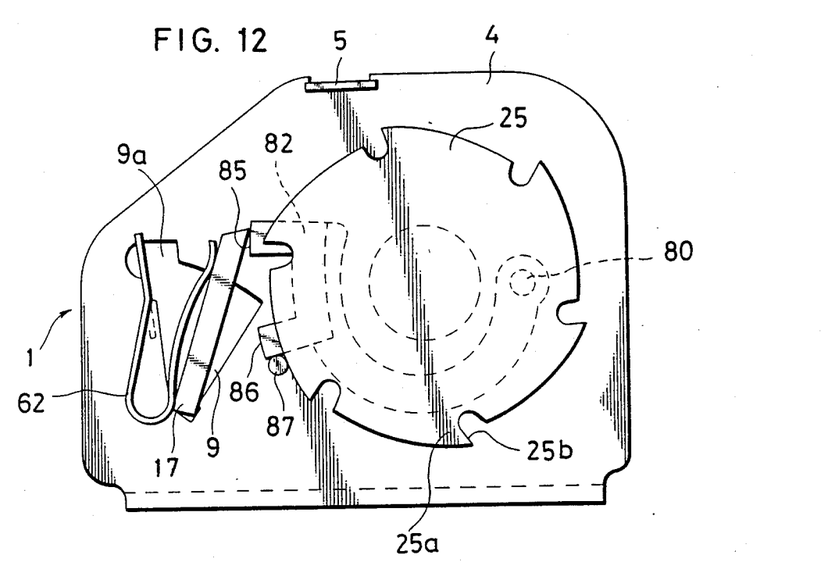
FIG. 12 is similar to FIG. 9 but illustrates the automatic locking retractor according to the fifth embodiment of this invention.
Figure 13:
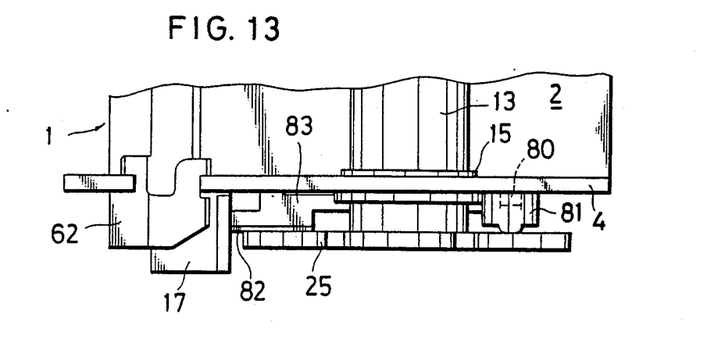
FIG. 13 is a fragmentary top plan view of the automatic locking retractor according to the fifth embodiment of this invention.

Referring next to FIGS. 11 through 13, description will be made on the automatic locking retractor according to the fifth embodiment of this invention, in which a cam member 83 is allowed to rock about a pin which is offset from the center of rotation of the take-up spindle 13.

The cam member 83 has a bow-like shape as shown by solid lines in FIG. 11. It defines at one end thereof a shaft 81, which in turn defines a recess in which a short protrusion 80 formed by semi-shearing on the side wall 4 is fit, and at the other end thereof arms 85,86 which serve as first and second cam portions respectively. A magnet 82 is attracted to the latch plate 25 at an area confronting the other end of the cam member 83.

Owing to the magnetism of the magnet 82, the cam member 83 is allowed to rock together with the latch plate 25 about the short protrusion 80 between a position, where an arcuate inner wall 84 of the cam member 83 is brought into contact with the take-up spindle 13, and another position where the outer side wall of the arm 86 is brought into contact with a stopper 87 formed by semi-shearing on the side wall 4 and protruding outwardly from the side wall 4.

FIG. 12 illustrates the cam member 83 which is kept in contact with the stopper 87, in other words, in its first position. FIG. 13 shows, in a top plan, a part of the automatic locking retractor according to the fifth embodiment of this invention.

The operation of the automatic locking retractor according to the fifth embodiment is exactly the same as that of the automatic locking retractor according to the third embodiment.

Figure 14:
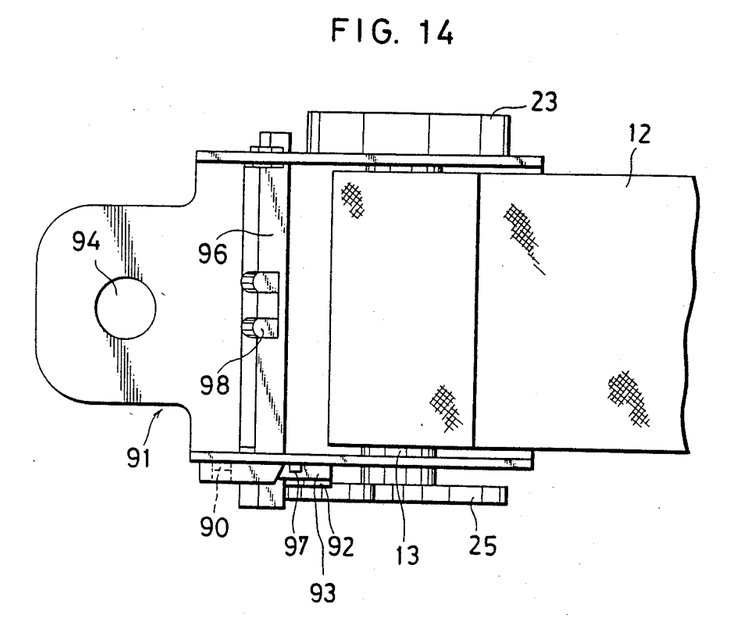
FIG. 14 is a top plan view of an automatic locking retractor according to the sixth embodiment of this invention.
Figure 15:
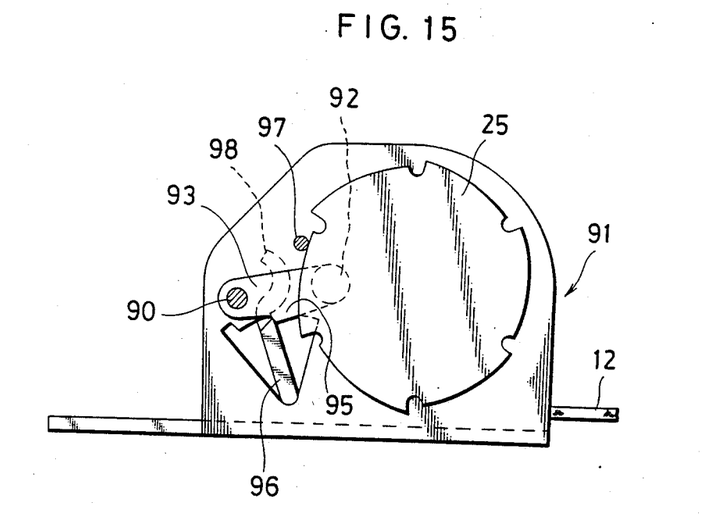
FIG. 15 is a side elevation of the automatic locking retractor of FIG. 14.

Referring next to FIGS. 14 and 15, description will be made on the automatic locking retractor according to the sixth embodiment of this invention in which similar to the fifth embodiment, a cam member 93 is allowed to rock about a short protrusion 90 which is offset from the center of rotation of the take-up spindle 13.

In the sixth embodiment, the cam member 93 defines only one jaw 95 as a first cam portion. A magnet 92 is bonded on the cam member 93 at one end thereof which is opposite to the short protrusion 90. Besides, a circular mounting hole 94 is bored through a casing 91 so as to mount the automatic locking retractor at a suitable place. Fingers 98 are formed as sensing portions integrally with a lock member 96.

Since the cam member 93 does not contain any second cam portion, the movement of the lock member 96 is somewhat different from the corresponding lock members in the preceding embodiments when rewinding the webbing. The other operation of the automatic locking retractor of the sixth embodiment is substantially the same as that of the third embodiment.

Furthermore, numeral 97 indicates a stopper formed on the side wall of the casing 91 in order to limit the upward rocking motion of the cam member 93.

The first to sixth embodiments of this invention have been described above. In each of these embodiments, the disk or cam member may be attracted on the take-up spindle. Instead of making the disk or cam member with a metal having its own magnetism imparted thereto or incorporating a magnet in the disk or cam member, it may also be possible to impart magnetism to the latch plate or take-up spindle or to impart magnetism to both of the disk or cam member and the latch plate or take-up spindle.

Having now fully described the invention, it will be apparent to one of ordinary skill in the art that many changes and modifications can be made thereto without departing from the spirit or scope of the invention as set forth herein.

What is claimed is:

1. An automatic locking retractor comprising:
    a casing;
    support means provided with the casing;
    a take-up spindle for winding a webbing thereon, said take-up spindle being supported on the casing and rotatable in a webbing-winding and webbing-releasing direction and biased in the webbing-winding direction;
    a latch plate equipped with teeth comprising interlocking faces oriented toward the webbing-releasing direction, and rotatable as a unitary member with the take-up spindle;
    a lock member movable between a locking position, where the lock member is brought into engagement with any one of the interlocking faces so that the take-up spindle is prevented from rotating in the webbing-releasing direction but is allowed to rotate in the webbing-winding direction, and a non-locking position where the lock member is maintained out of engagement with any of the interlocking faces;
    control means for guiding the lock member from the non-locking position to the locking position when the webbing has been rewound subsequent to its release over at least a predetermined length thereof, said control means comprising a cam member supported on the support means adjacent to the latch plate and movable within a predetermined range, one of said latch plate and cam member being provided with a magnetic material and the other comprising a material which can be magnetically attracted, and said support means being provided with a protrusion and said cam member being provided with a slot capable of receiving the protrusion therein and having a longitudinal length longer than the longitudinal length of the protrusion to permit movement of said protrusion within said slot to allow movement of said cam within said predetermined range; and sensing means for sensing each rewinding of the webbing at least over the predetermined length thereof to maintain the lock member at the non-locking position;

wherein said protrusion has a rectangular cross-sectional shape and said slot has a rectangular shape.

* * * * *